(12) United States Patent
Kumar et al.

(10) Patent No.: US 10,230,122 B2
(45) Date of Patent: Mar. 12, 2019

(54) MICROBRIAL FUEL CELLS

(71) Applicant: SRM University, Tamil Nadu (IN)

(72) Inventors: Saravana Kumar, Tamil Nadu (IN); Harinipriya Seshadri, Tamil Nadu (IN); Mani Sindhuja, Kattankulathur (IN)

(73) Assignee: SRM UNIVERSITY, Tamil Nadu (IN)

( * ) Notice: Subject to any disclaimer, the term of this patent is extended or adjusted under 35 U.S.C. 154(b) by 65 days.

(21) Appl. No.: 15/205,085

(22) Filed: Jul. 8, 2016

(65) Prior Publication Data
US 2017/0012314 A1 Jan. 12, 2017

(30) Foreign Application Priority Data
Jul. 9, 2015 (IN) .......................... 3508/CHE/2015

(51) Int. Cl.
*H01M 8/16* (2006.01)
*H01M 8/02* (2016.01)
*H01M 8/04746* (2016.01)
*H01M 8/24* (2016.01)
*H01M 8/0271* (2016.01)
*H01M 8/04* (2016.01)

(52) U.S. Cl.
CPC ........... *H01M 8/16* (2013.01); *H01M 8/0271* (2013.01); *H01M 8/04* (2013.01); *Y02E 60/527* (2013.01)

(58) Field of Classification Search
CPC ...................................................... H01M 8/16
See application file for complete search history.

(56) References Cited

U.S. PATENT DOCUMENTS

| | | | |
|---|---|---|---|
| 2007/0048577 A1* | 3/2007 | Ringeisen ........... | H01M 8/0232 429/401 |
| 2011/0135966 A1* | 6/2011 | Jayaprakash ....... | H01M 8/1023 429/2 |
| 2011/0135967 A1* | 6/2011 | Pellissier ................ | H01M 8/16 429/2 |
| 2013/0011696 A1* | 1/2013 | Wallin .................... | H01M 8/16 429/2 |

OTHER PUBLICATIONS

Min et al., "Electricity generation using membrane and salt bridge microbial fuel cells," Mar. 31, 2005, Water Research, 39, 1675-1686. (Year: 2005).*

(Continued)

*Primary Examiner* — Ula C Ruddock
*Assistant Examiner* — Matthew W Van Oudenaren
(74) *Attorney, Agent, or Firm* — Westman, Champlin & Koehler, P.A.

(57) ABSTRACT

The present invention relates to microbial fuel cells, which can be prepared from easily available starting material. The microbial fuel cell of the present disclosure comprises an anode chamber having an anode and a cathode chamber having a cathode. The anode chamber is filled with a mixture comprising a buffer solution, nutrients and a microbial inoculum. The cathode chamber is filled with a catholyte mediator and an electron mediator. The cathode chamber and the anode chamber are connected with each other via a salt bridge; the cathode and the anode is connected through an external electrical circuit, with the anode chamber sealed to maintain anaerobic condition and the cathode chamber is maintained in aerobic condition.

14 Claims, 13 Drawing Sheets

(56) References Cited

OTHER PUBLICATIONS

Mohan et al., "Electricity generation using microbial fuel cells," Aug. 29, 2007, International Journey of Hydrogen Research, 33, 423-426. (Year: 2007).*
Logan et al., "Microbial Fuel Cells—Challenges and Applications," Sep. 1, 2006, Environmental Science & Technology, 5172-5180. (Year: 2006).*

* cited by examiner

MICROBRIAL FUEL CELLS

CROSS-REFERENCE TO RELATED APPLICATION

This Application is a non-provisional Application of Indian Application No. 3508/CHE/2015, filed Jul. 9, 2015, in English, the contents of which are hereby incorporated by reference in their entirety.

FIELD

The present disclosure generally relates to the field of power generation.

Particularly, the present disclosure relates to systems and methods relating to power generation from microbial fuel cells.

BACKGROUND

A Microbial Fuel Cell (MFC) is a device in which a microbial population present in a liquid or semi-liquid microbial medium performs electrochemical reactions to provide an electrical current through an external circuit disposed between an anode and a cathode. A typical MFC 100 is shown in FIG. 1 by way of an example. The MFC 100 includes a vessel 110 divided into an anode chamber 120 and a cathode chamber 130 by a semi-permeable membrane 140, which is typically a proton exchange membrane (PEM). The semi-permeable membrane 140 provides a conduction path for hydrogen ions but not electrons, which then must travel over the external circuit 180 to reach the cathode 160.

An anode 150 is provided in the anode chamber 120 while a cathode 160 is provided in the cathode chamber 130. Further, a population of microbes 170 is provided in the anode chamber. An external circuit electrically connects the anode 150 and the cathode 160. Each of the chambers 120, 130, is provided with a solution 190 in which the anode 150 and cathode 160 are at least partially immersed and within which the population of microbes 170 is maintained.

In operation, a nutrient is added to the solution 190 and the microbes 170 consume the nutrient, under anaerobic conditions in the anode chamber. The microbes 170 therefore obtain oxygen by splitting water into hydrogen ions, oxygen, and electrons. The oxygen is combined with the carbon from the nutrient to form carbon dioxide, the hydrogen ions migrate across the membrane 140 to the cathode 160, and the electrons traverse the external circuit 180 from the anode 150 to the cathode 160 where the electrons combine with the hydrogen ions.

OBJECTS

Some of the objects of the present disclosure, which at least one embodiment satisfies, are described herein below:

It is an object of the present disclosure to provide an easy, user friendly and cost effective process for fabrication and scaling up of microbial fuel cells (MFCs) from wastes.

Another object of the present disclosure is to provide a real time power utility based on MFCs.

A further object of the present disclosure is to provide higher power density and current density through MFCs.

One more object of the present disclosure is to provide an efficient device and/or apparatus for recycling and reuse of sewage water.

Other objects and advantages of the system of the present disclosure will be more apparent from the following description when read in conjunction with the accompanying figures, which are not intended to limit the scope of the present disclosure.

SUMMARY

In accordance with an embodiment, a microbial fuel cell is described comprising an anode chamber having an anode, the anode chamber filled with a first mixture of a buffer solution, nutrients, and at least one microbial inoculum, a cathode chamber having a cathode, the cathode chamber filled with a second mixture of a catholyte mediator and an electron mediator, the cathode chamber connected to the anode chamber via a salt bridge and the cathode and the anode connected through an external electrical circuit, wherein the anode is sealed to maintain anaerobic condition inside the anode chamber while the cathode chamber is maintained in aerobic condition.

In an embodiment, a passage is provided in an operative top cover of the anode chamber to allow escape of unwanted gases.

In an embodiment, a passage is provided in an operative top cover of the cathode chamber to allow aerobic condition.

In an embodiment, the salt bridge includes a tubular structure open at both ends and filled with agar-agar gel mixed with saturated potassium chloride (KCl).

In an embodiment, the microbial inoculum is cow dung.

In an embodiment, the nutrient is at least one selected from the group consisting of fruit waste, vegetable waste, biodegradable waste and kitchen waste.

In an embodiment, the catholyte is 50 mM phosphate buffer solution.

In an embodiment, the electron mediator is a 1M potassium ferricyanide solution.

Also described is a Microbial fuel cell stack comprising a plurality of the microbial fuel cells connected either in series or in parallel.

BRIEF DESCRIPTION OF ACCOMPANYING DRAWINGS

The subject matter of the present disclosure will now be explained in relation to the non-limiting accompanying drawings, in which.

DETAILED DESCRIPTION OF THE ACCOMPANYING DRAWINGS

A microbial fuel cell (hereinafter referred to as 'MFC') in accordance with the present disclosure will now be described with reference to the accompanying drawings which do not limit the scope and ambit of the present disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description hereinafter, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Figure 1:
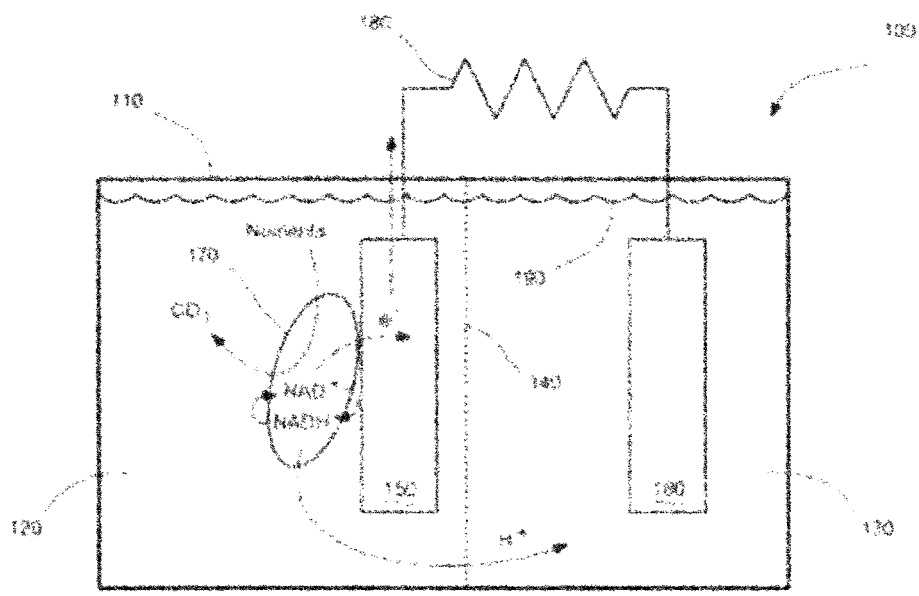
FIG. 1 illustrates a schematic of a typical microbial fuel cell (MFC)
Figure 2:
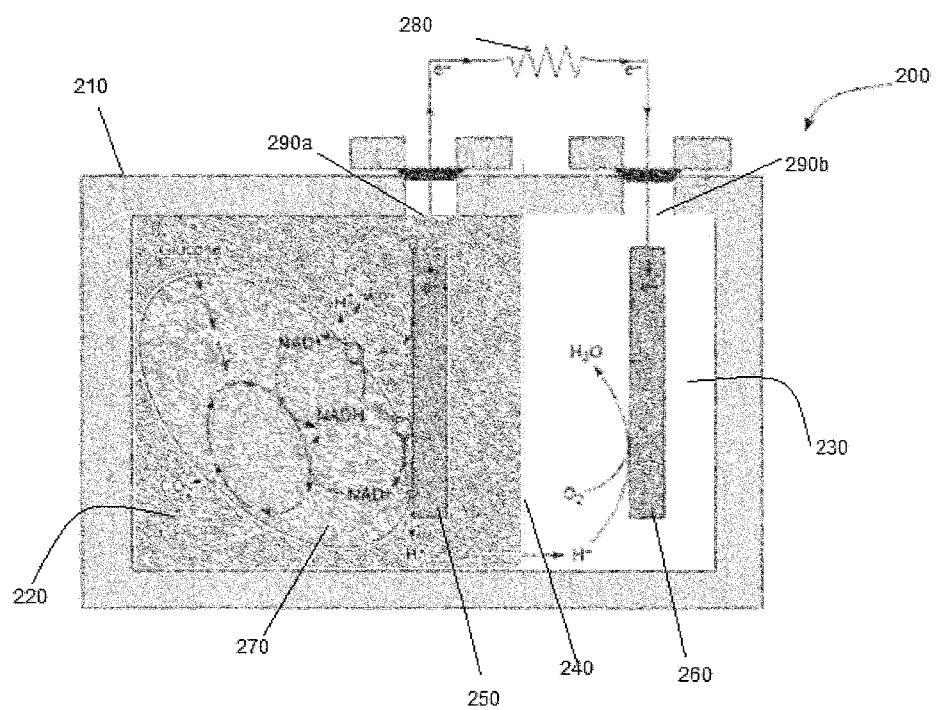
FIG. 2 illustrates a schematic of an exemplary microbial fuel cell, in accordance with an embodiment of the present disclosure.
Figure 3:
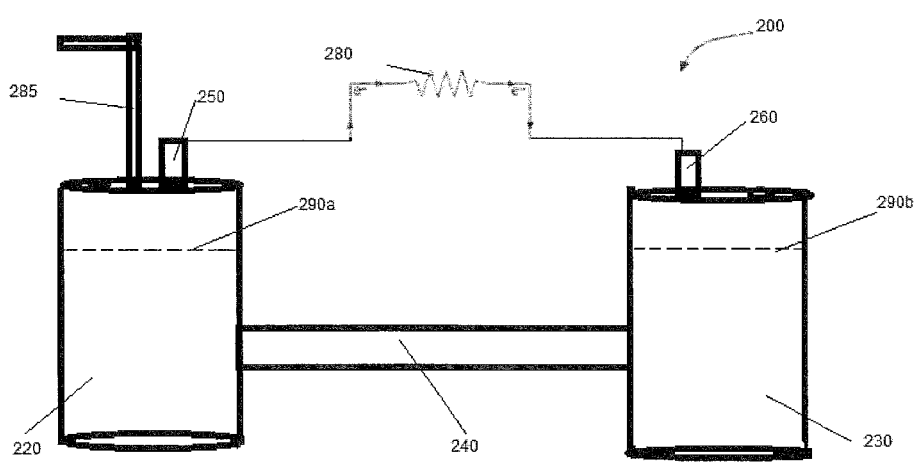
FIG. 3 illustrates another schematic of the microbial fuel cell of FIG. 2.

With regard to FIG. 2 and FIG. 3, an exemplary MFC 200 is shown in accordance with an embodiment of the present disclosure. The MFC 200 is different from the MFC 100 as described earlier in the sense that in the MFC 200, the anode chamber and the cathode chamber are kept separate from one another with a salt bridge 240 acting as the proton exchange medium between the two. Further, the anode chamber is kept in anaerobic condition while the cathode chamber is kept aerobic. Furthermore, mediators are provided in the cathode chamber to enhance the transport of electron generated by the microbes.

In an embodiment, the MFC 200 includes a cell unit 210 of two or more plastic containers, each having a total volume of 5000 ml/2000 ml, as the case may be, and a working volume of around 4000 ml/1500 ml. In an embodiment, at least two separate plastic containers, one acting as an anode chamber 220 having an anode 250 and the other acting as a cathode chamber 230 having a cathode 260, are connected through a polymer based hose pipe 240 open at both the ends. The hose pipe 240 is filled with agar-agar gel mixed with saturated potassium chloride (KCl) and acts as the salt bridge for ionic conductivity.

In an embodiment, the electrodes 250, 260 are made of carbon material and include carbon rods, graphite carbon rods, compressed activated charcoal electrodes, and the likes. The electrodes 250, 260 are connected to each other through an external circuit 280 composed of copper wires, which act as current conductors. The anode chamber 220 is filled with a first mixture 290*a* having 4000 ml/1500 ml, 50 mM phosphate buffer and 2000 g (wet weight) of nutrients (waste pulp) and 100 g (wet weight) of cow dung as inoculum or microbial media 270. The nutrients may include kitchen waste, food waste, organic biodegradable wastes, rotten vegetables, rotten fruits, rotten food and the like. The microbial media 270 have microbes such as *Geobacter sulfurreducens* and *Shewanella oneidensis* to digest the nutrients, in particular glucose, available in the mixture 290*a*.

In an embodiment, the anode is sealed with a chemical mixture of polyurethane resin base, di-isodecyl phthalate, xylene, calcium oxide, ethylbenzene and diphenyl methane 4,4-di-isocyanate. The mixture acts as a sealant to maintain anaerobic condition inside the anode chamber. Further, a straw 285 is introduced from an operative top cover of the anode chamber to allow escape of unwanted gases like $CH_4$. An outside open end of the straw is dipped into water to let the unwanted gases dissolve into it.

Further, the cathode chamber 230 is kept in aerobic condition where oxygen is used as an electron acceptor for the electrode. For this purpose, the container acting as the cathode chamber 230 may be provided with air through a straw introduced from an operative top cover of the container 210. The cathode chamber is filled with a second mixture 290*b* having 4000 ml/1500 ml of 50 mM phosphate buffer as catholyte mediator and 1M potassium ferricyanide as electron acceptor/mediator. Catholyte solution was continuously stirred (50 rpm) using magnetic beads to ensure effective contact between proton, electron and mediator.

In an embodiment, a plurality of such MFCs 200 are connected in series and parallel to achieve an open circuit voltage (OCV)>10V and short circuit current (ISC)>0.1 A.

For example, a five in number, 2-liter capacity tomato fruit pulp based MFC having five cells in series with single electrode configuration is able to provide 2 V, 2 mA current, the power density being 0.32 $W/m^2$ per set up. This output is consistent for approximately 180 days and is 250 times higher than what is provided by conventional MFCs.

Similarly, a 5-liter capacity orange fruit pulp based MFC, having five electrodes in series is able provide 0.6 V, 2 mA current, the power density being 94.05 $mW/m^2$ per electrode. Accordingly, as there are five electrodes, the power density attained per set up is 0.47 $W/m^2$. Again, this output is consistent for approximately 180 days and is 400 times higher than what is generally provided by conventional MFCs. In each of the cases mentioned above, the electrode used are having a radius of 2.5 cm and a height of 15 cm.

Day to Day Performance of MFCs in accordance with the present disclosure is recorded for the following three set-ups:

1. Tomato Set Up

| Day | Voltage (V) | Current (mA) |
| --- | --- | --- |
| 1 | 1.38 | 3.5 |
| 2 | 1.57 | 3.5 |
| 3 | 1.57 | 3.5 |
| 4 | 1.57 | 3.5 |
| 5 | 1.57 | 3.5 |

-continued

| Day | Voltage (V) | Current (mA) |
|---|---|---|
| 6 | 1.57 | 3.5 |
| 7 | 1.57 | 3.5 |
| 8 | 1.57 | 3.5 |
| 9 | 1.57 | 3.5 |
| 10 | 1.57 | 3.5 |
| 11 | 1.57 | 3.5 |
| 12 | 1.57 | 3.5 |
| 13 | 1.57 | 3.5 |
| 14 | 1.57 | 3.5 |
| 15 | 1.57 | 3.5 |
| 16 | 1.57 | 3.5 |
| 17 | 1.57 | 3.5 |
| 18 | 1.57 | 3.5 |
| 19 | 1.57 | 3.5 |
| 20 | 1.57 | 3.5 |
| 21 | 1.57 | 3.5 |
| 22 | 1.57 | 3.5 |
| 23 | 1.57 | 3.5 |
| 24 | 1.57 | 3.5 |
| 25 | 1.57 | 3.5 |
| 26 | 1.57 | 3.5 |
| 27 | 1.57 | 3.5 |
| 28 | 1.57 | 3.5 |
| 29 | 1.57 | 3.5 |
| 30 | 1.57 | 3.5 |
| 31 | 1.57 | 3.5 |
| 32 | 1.57 | 3.5 |
| 33 | 1.57 | 3.5 |
| 34 | 1.57 | 3.5 |
| 35 | 1.57 | 3.5 |
| 36 | 1.57 | 3.5 |
| 37 | 1.57 | 3.5 |
| 38 | 1.57 | 3.5 |
| 39 | 1.57 | 3.5 |
| 40 | 1.57 | 3.5 |
| 41 | 1.57 | 3.5 |
| 42 | 1.57 | 3.5 |
| 43 | 1.57 | 3.5 |
| 44 | 1.57 | 3.5 |
| 45 | 1.57 | 3.5 |
| 46 | 1.57 | 3.5 |
| 47 | 1.57 | 3.5 |
| 48 | 1.57 | 3.5 |
| 49 | 1.57 | 3.5 |
| 50 | 1.57 | 3.5 |
| 51 | 1.57 | 3.5 |
| 52 | 1.57 | 3.5 |
| 53 | 1.57 | 3.5 |
| 54 | 1.57 | 3.5 |
| 55 | 1.57 | 3.5 |
| 56 | 1.57 | 3.5 |
| 57 | 1.57 | 3.5 |
| 58 | 1.57 | 3.5 |
| 59 | 1.57 | 3.5 |
| 60 | 1.57 | 3.5 |

2. Sweet Lime Set Up (5 Liters with 5 Electrodes Configuration)

| Day | Voltage (V) | Current (mA) |
|---|---|---|
| 1 | 0.4 | 2.55 |
| 2 | 0.52 | 3.23 |
| 3 | 0.55 | 3.16 |
| 4 | 0.54 | 3.06 |
| 5 | 0.51 | 2.33 |
| 6 | 0.53 | 3.12 |
| 7 | 0.51 | 3.19 |
| 8 | 0.52 | 3.19 |
| 11 | 0.49 | 2.83 |
| 12 | 0.51 | 2.89 |
| 13 | 0.51 | 2.8 |
| 18 | 0.5 | 3 |
| 19 | 0.51 | 2.85 |
| 20 | 0.51 | 3.08 |
| 21 | 0.51 | 3.12 |
| 22 | 0.51 | 2.77 |
| 23 | 0.51 | 2.87 |
| 25 | 0.47 | 2.5 |
| 26 | 0.47 | 2.8 |
| 27 | 0.46 | 2.72 |
| 28 | 0.46 | 2.65 |
| 29 | 0.46 | 2.46 |
| 30 | 0.47 | 2.78 |
| 32 | 0.46 | 2.64 |
| 33 | 0.46 | 2.7 |
| 34 | 0.46 | 2.67 |
| 35 | 0.46 | 2.7 |

3. Sweet Lime Set Up (5 Liters with 5 Electrodes Configuration, Potential and Current Across Each Electrode)

| | Voltage (V) at different carbon rod | | | | Current (mA) at different carbon rod | | | |
|---|---|---|---|---|---|---|---|---|
| Day | 1-1 | 2-2 | 3-3 | 4-4 | 1-1 | 2-2 | 3-3 | 4-4 |
| 1 | 0.36 | 0.48 | 0.27 | 0.29 | 2.25 | 2.67 | 2.18 | 1.81 |
| 2 | 0.53 | 0.52 | 0.4 | 0.43 | 3.09 | 3.08 | 2.57 | 2.86 |
| 3 | 0.61 | 0.44 | 0.42 | 0.56 | 3.11 | 3.02 | 2.52 | 2.85 |
| 4 | 0.55 | 0.51 | 0.36 | 0.47 | 1.51 | 2.59 | 1.67 | 2.57 |
| 5 | 0.56 | 0.52 | 0.44 | 0.47 | 0.25 | 2.91 | 0.2 | 2.49 |
| 6 | 0.52 | 0.53 | 0.43 | 0.47 | 2.5 | 3.03 | 1.76 | 2.62 |
| 7 | 0.62 | 0.54 | 0.41 | 0.47 | 3.6 | 3.23 | 2.89 | 2.88 |
| 8 | 0.59 | 0.54 | 0.43 | 0.43 | 3.69 | 3.35 | 2.4 | 3.03 |
| 11 | 0.57 | 0.53 | 0.48 | 0.48 | 3.78 | 3.23 | 3.1 | 3.12 |
| 12 | 0.49 | 0.49 | 0.41 | 0.48 | 3.55 | 2.9 | 2.72 | 2.87 |
| 13 | 0.49 | 0.48 | 0.36 | 0.47 | 3.42 | 2.5 | 2.61 | 2.31 |
| 18 | 0.48 | 0.47 | 0.35 | 0.47 | 3.11 | 3.2 | 2.58 | 2.75 |
| 19 | 0.47 | 0.46 | 0.46 | 0.47 | 2.76 | 3.21 | 2.58 | 2.53 |
| 20 | 0.45 | 0.46 | 0.47 | 0.47 | 2.9 | 2.86 | 0.98 | 2.44 |
| 21 | 0.46 | 0.47 | 0.44 | 0.47 | 3.04 | 2.81 | 0.89 | 2.32 |
| 22 | 0.51 | 0.5 | 0.47 | 0.47 | 2.66 | 2.39 | 2.46 | 2.6 |
| 23 | 0.51 | 0.51 | 0.47 | 0.47 | 2.89 | 3.01 | 2.19 | 2.75 |
| 25 | 0.46 | 0.44 | 0.44 | 0.44 | 2.34 | 2.64 | 2.59 | 2.72 |
| 26 | 0.43 | 0.43 | 0.42 | 0.42 | 2.51 | 2.41 | 2.76 | 2.67 |
| 27 | 0.44 | 0.43 | 0.43 | 0.43 | 2.54 | 2.21 | 2.65 | 2.59 |
| 28 | 0.44 | 0.42 | 0.43 | 0.43 | 2.43 | 2.39 | 2.37 | 2.44 |
| 29 | 0.44 | 0.42 | 0.43 | 0.41 | 2.65 | 2.23 | 2.46 | 2.3 |
| 30 | 0.45 | 0.43 | 0.43 | 0.43 | 2.59 | 2.26 | 2.55 | 2.6 |
| 32 | 0.44 | 0.39 | 0.43 | 0.43 | 2.5 | 2.25 | 2.47 | 2.38 |
| 33 | 0.44 | 0.43 | 0.39 | 0.43 | 2.35 | 2.36 | 2.52 | 2.3 |
| 34 | 0.44 | 0.39 | 0.39 | 0.43 | 2.56 | 2.49 | 2.58 | 2.51 |
| 35 | 0.44 | 0.43 | 0.43 | 0.43 | 2.51 | 2.36 | 2.52 | 2.48 |

In one working example, two types of electrodes
i) activated charcoal; and
ii) commercially available graphite rods
were used for comparison of the efficiency.

Figure 4:
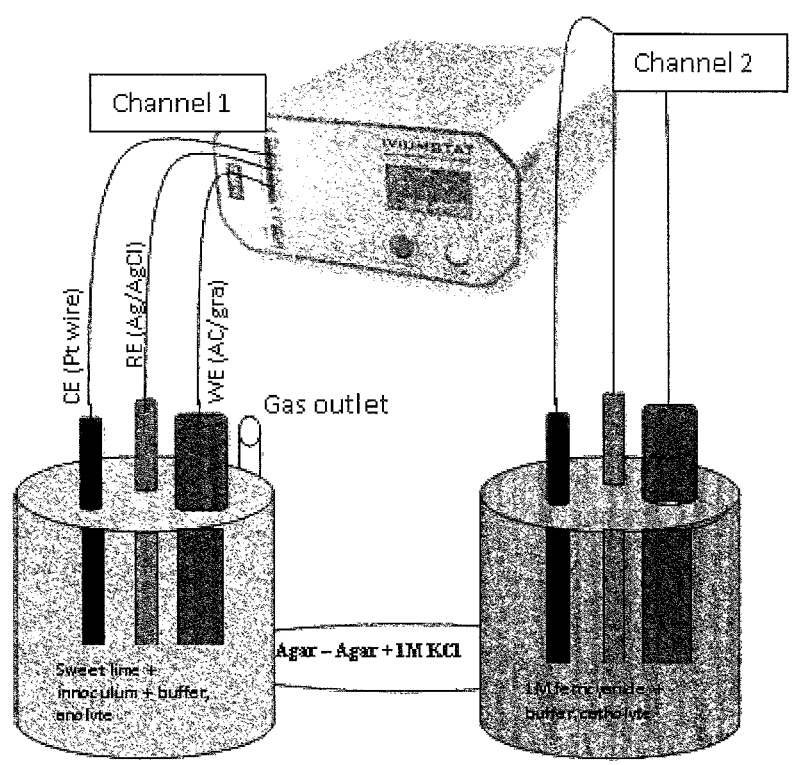
FIG. 4 illustrates three electrode assembly to analyse anolyte and catholyte separately by the electrochemical workstation.

In the present example, anodic chamber was completely sealed to maintain anaerobic condition. The electrons generated in anodic chamber were transferred to cathodic chamber by the external circuit. The proton transfer occurred through the salt bridge to the cathode to complete the circuit. The value of voltage was recorded in 60 minutes interval. Electrochemical impedance spectroscopy (EIS) experiments were conducted with the help of Biologic Electrochemical Workstation in the frequency range of 200 kHz down to 100 MHz Impedance data were collected from 24 hrs to 576 hrs after fabrication of MFCs. Linear Sweep Voltammetry was carried out via three electrode assembly with anode as working electrode, platinum wire as counter electrode and silver/silver chloride as reference electrode employing Iviumstat spectroelectrochemical workstation at different scan rates. Ohmic losses were caused by the electrical resistance of the electrodes, the electrolyte and the proton exchange membrane. In the three electrode measurements Platinum wire was used as counter electrode (FIG. 4). All the experiments and operation of MFCs were carried out at room temperature.

In another working example, lumped equivalent circuit model for activated charcoal based MFCs and Nyquist plot equivalent circuit fitting for graphite based MFCs were analysed and compared.

A. Electrochemical processes and interfaces:
  1. Stoichiometric reactions for Microbial Fuel cell:

Microbial Fuel Cell $C_6H_{12}O_6 + 6O_2 \longrightarrow 6H_2O + 6CO_2$
  2. Anodic Reaction: $C_6H_{12}O_6 + 6H_2O \longrightarrow 6CO_2 + 24H^+ + 24e$
  3. Cathodic Reaction: $6O_2 + 24H^+ + 24e^- \longrightarrow 12H_2O$
  4. The following components were used in the example:
     i. Anode/Electrolyte interface—Biofilm formation, oxidation of sugar to Carbon dioxide and electron generation occurred which contributed to charge transfer resistance ($R_{ct}$);
     ii. Membrane resistance or ohmic resistance ($R_\Omega$)—Charge transfer such as proton transfer occurred;
     iii. Cathode/Electrolyte interface—Reduction of the redox mediator, gaseous product formation like $H_2$ or $CH_4$ released through the straw connected in the lid of the cathode contributed to Warburg impedance or charge transfer resistance ($R_{ct}$).

B. The parameters employed in the development of lumped equivalent circuit model:
  a. the ohmic over potential was neglected due to the utility of highly conducting electrode (Pt) as counter during the measurements;
  b. the redox reaction was assumed to be in steady-state condition, hence $C_{ox} = C_{red}$;
  c. the half cell voltage: $V_{half\ cell} = E_{half\ cell} - \eta_{half\ cell}$ (voltage of cathode: $V_c = E_c - \eta_c$);
  d. the electrolyte employed in the present example was 1 mol l$^{-1}$ potassium ferricyanide which possess quasi constant potential and was a good redox mediator, $\eta_{c,act}$ was neglected in the model;
  e. anolyte resistance corresponds to the internal resistance of the cell;
  f. the open circuit potential of anolyte measured was approximated to the redox potential of sucrose on activated charcoal (0.4 V) at 200 mA/s;
  g. at lower scan rates the open circuit voltage of anolyte was close to zero, due to less or non formation of biofilm on the electrode surface. After day 1 as the biofilm resistance was built, higher scan rates like 200 mA/s started showing higher open circuit voltage, hence for catholyte the OCV was taken at lower scan rates whereas for anolyte at higher scan rates;
  h. parameters employed:
     i. number of electrons involved in sucrose oxidation, n=6;
     ii. pH=6;
     iii. $E^0_{(Mox/Mred)} = 0.4$ V;
     iv. $V_c = 0.36$ V; and
     V. $R_{int}$ obtained from anolyte experiments and $R_{ext}$ obtained from full cell experiments.

Figure 5:
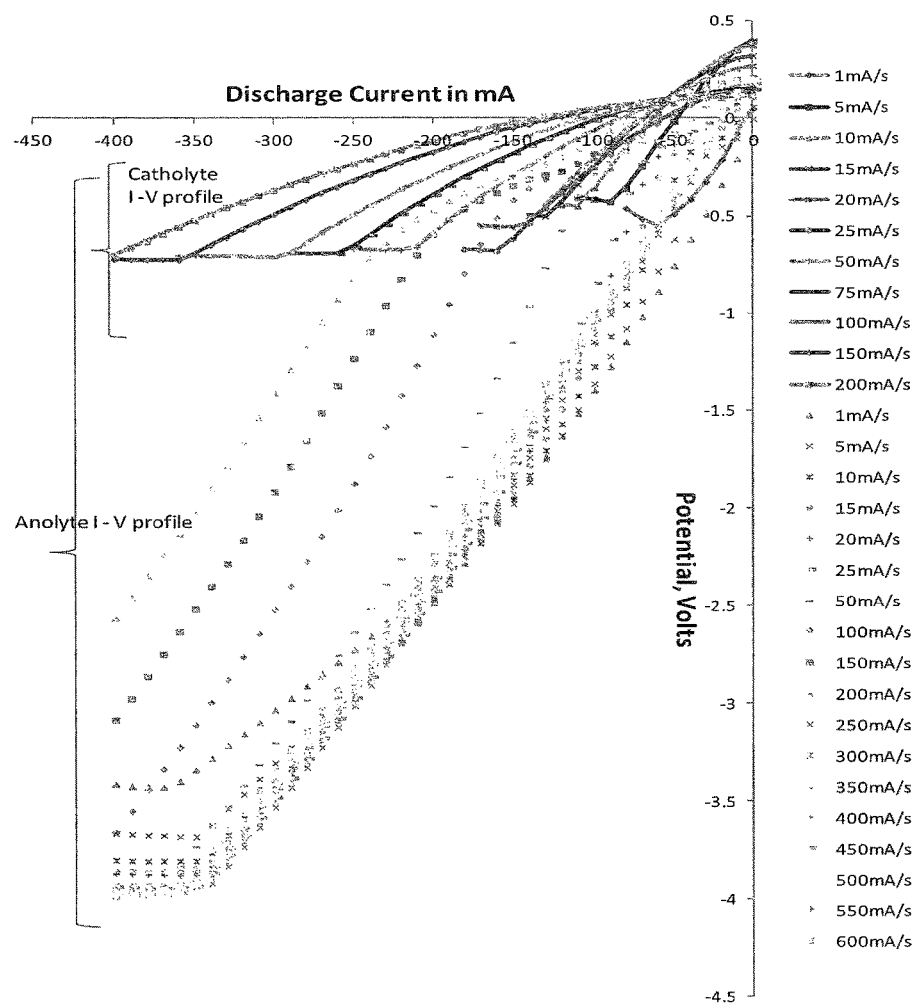
FIG. 5 illustrates a graph of current-potential profile of catholyte and anolyte.

C. Characterization of Activated Charcoal based Microbial Fuel Cells:
  a. I-V characteristics of Catholyte: the scan rate was varied from 1 mA/s to 200 mA/s. From the I-V characteristics of catholyte (1 mol l$^{-1}$ of Potassium Ferricyanide in 100 milliliter of 50 mmol l-1 phosphate buffer, (FIG. 5)) it was seen that maximum open circuit potential of 0.36 V was obtained at 5 and 10 mA/s, whereas at higher scan rate of 100 to 200 mA/s the open circuit potential dropped to 0.15 V, as a result of the change in the ion or mass transfer rates at the electrical double layer. The short circuit current being high at higher scan rates (upto 150 mA at 200 mA/s);

The cathodic voltage:

$$V_c = Ec - \eta_{c,act} \qquad \text{Eq (1)}$$

Since the electrolyte employed was 1 mol l$^{-1}$ Potassium Ferricyanide (which possess quasi constant potential and a good redox mediator), $\eta_{c,act}$ was neglected and hence, $$V_c = E_c \qquad \text{Eq (2)}$$

Figure 6:
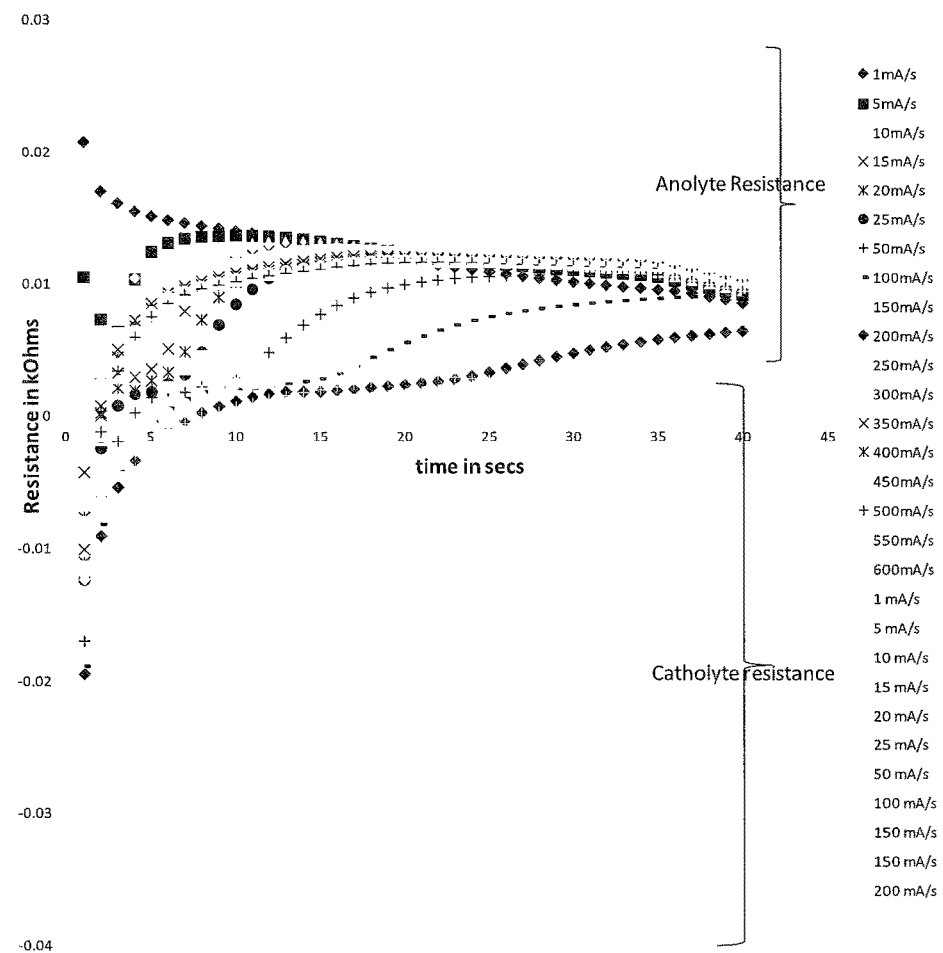
FIG. 6 illustrates a graph of resistance profile with time for anolyte and catholyte.

Therefore, the cathodic potential of the cell was obtained as 0.36 V.
  b. Resistance profile of the Catholyte:
    As an verification to the assumption of quasi constant voltage for 1 mol l$^{-1}$ Potassium Ferricyanide redox mediator in 50 mmol l$^{-1}$ phosphate buffer solution, the resistance measured at all scan rates was narrowed down to almost zero or negligible. Thus, $\eta_{c,act}$ was neglected (FIG. 6).

Figure 7:
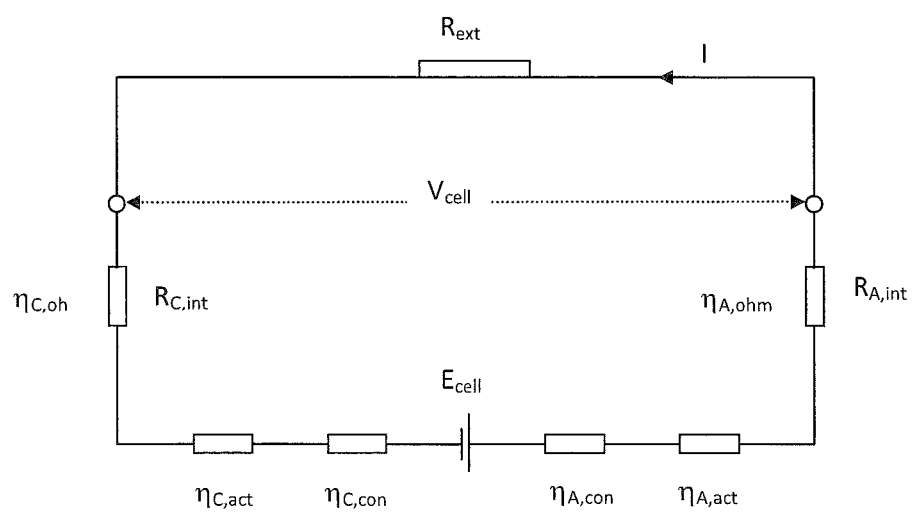
FIG. 7 illustrates lumped equivalent circuit of activated charcoal based MFC.

I-V characteristics of Anolyte:
  The scan rate was varied from 1 mA/s to 600 mA/s. From the I-V characteristics of anolyte (10 g of sweet lime pulp and 1 g of cow dung 100 ml of 50 mM phosphate buffer (FIG. 5)) it was clear that maximum open circuit potential of 0.4 V is obtained at 200 mA/s, whereas at very high scan rate of 600 mA/s the open circuit potential dropped to 0.15 V as a result of the change in the ion or mass transfer rates at the electrical double layer. The short circuit current reached a maximum of 400 mA at almost all scan rates (from 1 mA/s to 600 mA/s).
  c. Resistance profile of Anolyte:
    $R_{int}$ was experimentally obtained via anolyte resistance. The values of $R_{int}$ varied from 6 to 10Ω within the observed scan rates (indicating the higher conductance of the biofilm formed on the activated charcoal electrode (FIG. 7). By formation of microbial bio film on the activated charcoal, the conductance of the electrode raised upto semiconductor range of 0.167 S to 0.1 S.
  d. Lumped the equivalent circuit of Activated charcoal MFCs
    FIG. 7 represents a lumped equivalent circuit of MFCs.
    The cathodic voltage:

$$V_c = E_c - \eta_{c,act} \qquad \text{Eq (3)}$$

Since the electrolyte employed was 1M Potassium Ferricyanide (which possess quasi constant potential and a good redox mediator), $\eta_{c,act}$ was neglected and hence:

$$V_c = E_c \qquad \text{Eq (4)}$$

Using the equivalent circuit model, the cell voltage:

$$V_{cell} = IR_{ext} \qquad \text{Eq (5)}$$

$$V_{cell} = E_{cell} - \eta_{act} - \eta_{ohm} \qquad \text{Eq (6)}$$

$$\eta_{ohm} = IR_{int} \qquad \text{Eq (7)}$$

since, the ohmic over potential by cathode was neglected, the contribution would be only through anodic chamber and hence the resistance by anode: $R_{int}$ $$E_{cell} = (E_C - \eta_{C,act}) - (E_A + \eta_{A,act}) \quad \text{Eq (8)}$$

Upon substitution of equations (6, 7, 8) in (5) and (4) in (8):

$$\eta_{A,act} = V_C - E_A - I(R_{ext} + R_{int}) \quad \text{Eq (9)}$$

When $E_A$ was written in terms of Nernst equation, Equation (9) became:

$$\eta_{A,act} = V_C - E^0_{Mox/Mred} + 0.0043 \text{ pH} - I(R_{ext} + R_{int}) \quad \text{Eq (10)}$$

0.43 came from the fact of six electron transfer and $C_{ox} = C_{red}$. therefore, $$\eta_{A,act} = 0.36 - E^0_{Mox/Mred} + 0.0043 \text{ pH} - I(R_{ext} + R_{int}) \quad \text{Eq (11)}$$

$R_{int}$ was obtained from anolyte experiments and $R_{ext}$ was obtained from full cell experiments. The pH of the anaerobic solution was measured to be 6. So equation (11) reduces to:

$$\eta_{A,act} = 0.36 - E^0_{Mox/Mred} + 0.0258 - I(R_{ext} + R_{int}) \quad \text{Eq (12)}$$

The open circuit potential of anolyte measured was approximated to the redox potential of sucrose on activated charcoal (0.4 V). Thus, $E^0_{Mox/Mred} = 0.4V$, equation (10) reduces to:

$$\eta_{A,act} = -0.0142 - I(R_{ext} + R_{int}) \quad \text{Eq (13)}$$

Figure 8:
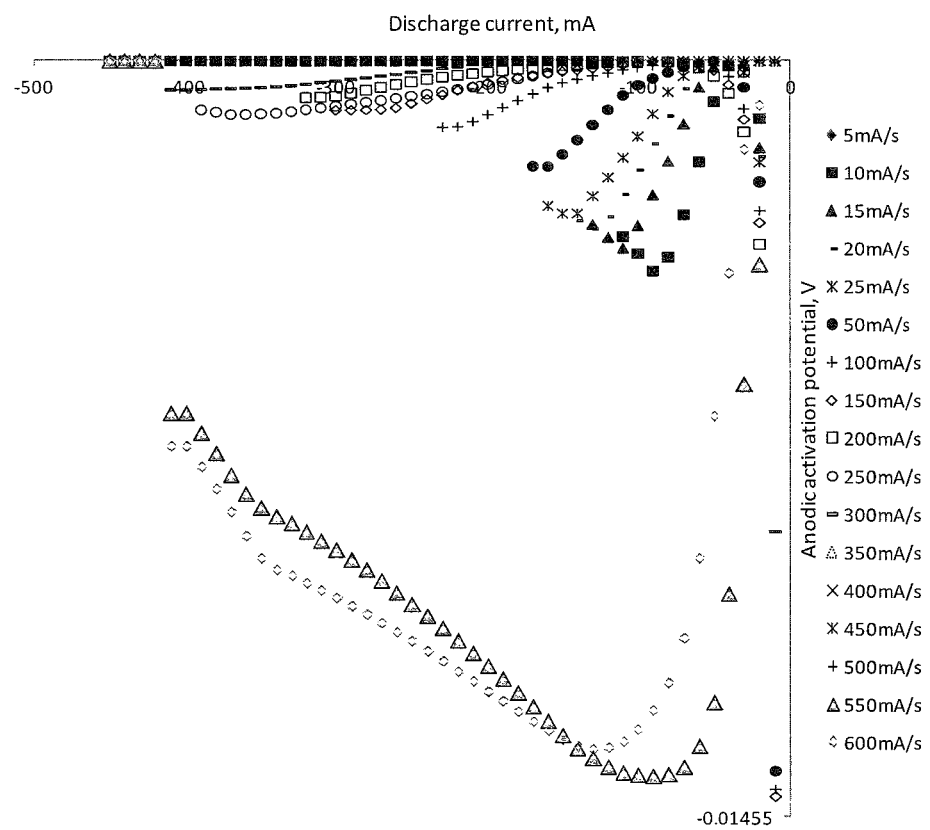
FIG. 8 illustrates a graph of $\eta_{A,act}$ vs discharge current of the Microbial Fuel Cell.

From the plot of $\eta_{A,act}$ Vs discharge current of the complete microbial fuel cell, indicated that the $\eta_{A,act}$ was well within the range of −0.15 to −0.14 V (FIG. 8). This clearly indicated the fact that activation polarization was not the rate determining step for sucrose oxidation on activated charcoal electrode. The activated charcoal had higher surface area and hence higher rate of electron transfer, no queuing of ions or electrons occurred on the electrode surface.

Figure 9:
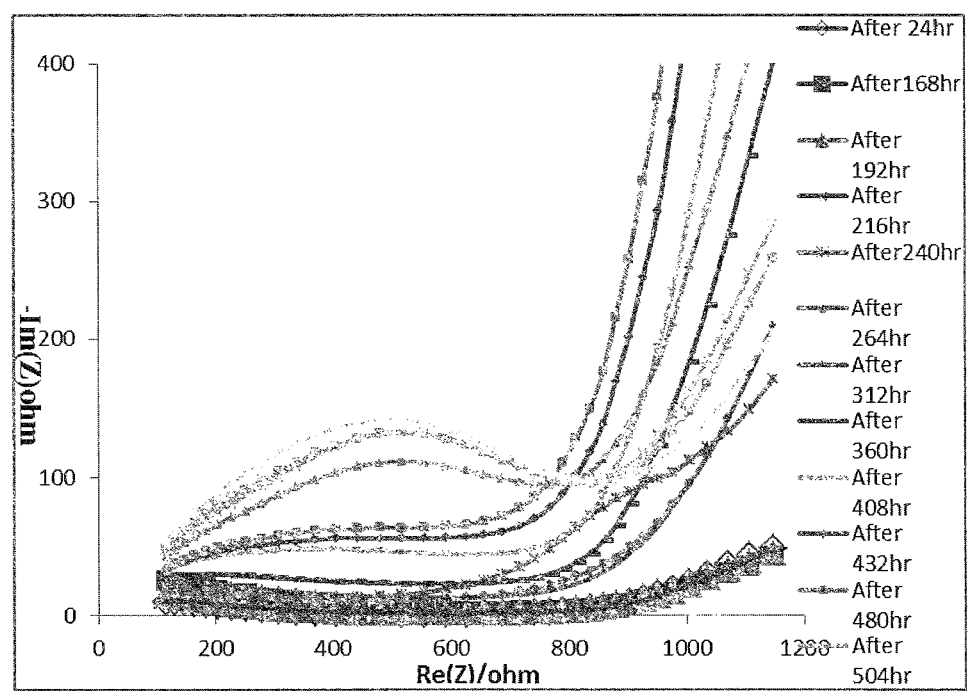
FIG. 9 illustrates a graph of Nyqusit impedance spectra of the microbial fuel cell from the time of fabrication.
Figure 10:
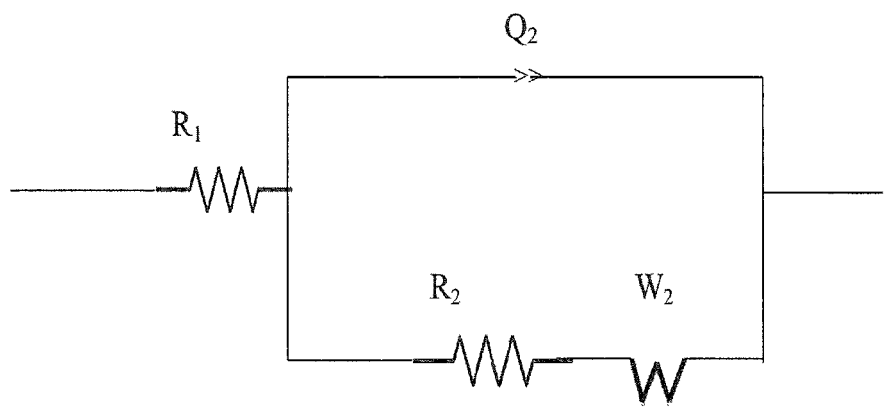
FIG. 10 illustrates electrical equivalent circuit employed to analyze the experimental impedance data.

D. EIS for graphite based MFC: A Nyquist complex impedance plot of dual chambered MFCs with sucrose substrate is given in FIG. 9. The key parameters affecting performance of MFCs such as solution ohmic resistance ($R_1$), charge transfer resistance ($R_2$) and its corresponding electrical double layer pseudo capacitances (Constant Phase Elements i.e. CPE) were extracted after fitting the impedance data on the circuit as shown in FIG. 10. The design of this electrical equivalent circuit was based on the physicochemical model of MFC composed of graphite electrode in contact with electrolyte solution (refer FIG. 2). In the electrical equivalent circuit depicted in FIG. 10, the resistor $R_1$ indicates the internal ohmic resistance i.e. resistance of the anolyte, catholyte solutions and membrane toward transfer of H$^+$ produced at the anode to the cathode, $R_2$ is cathodic and anodic charge transfer resistances respectively and is inversely proportional to the chemical reaction rate at the cathode and anode. The constant phase element CPE ($Q_2$) is corresponding to electrical double layer pseudo-capacitances of the cathode/catholyte and anode/anolyte electrochemical interfaces, respectively. These electrical equivalent circuits were designed on the basis of achieving the best fit for the observed experimental EIS data. Fitting and analysis of the EIS data were performed by EC Lab software.

TABLE 1

Values of Equivalent circuit parameters

| Time in hrs | $R_1(\Omega)$ | $R_2(\Omega)$ | $W_2(\Omega \cdot S^{-1/2})$ | $CPE(Q_2) \times 10^{-3}$ |
|---|---|---|---|---|
| 24 | 65.8 | 29.5 | 41.18 | 3.76 |
| 168 | 68.9 | 122.5 | 36.02 | 15.54 |
| 192 | 88.9 | 48.6 | 37.18 | 6.27 |
| 216 | 71.9 | 35.6 | 36.72 | 69.2 |
| 312 | 18.6 | 166.2 | 167.5 | 130.2 |
| 360 | 35.4 | 191 | 319.3 | 129.1 |
| 408 | 31.5 | 303.2 | 508.3 | 134.6 |
| 432 | 19.5 | 375.9 | 827.9 | 199.6 |
| 480 | 18.4 | 405.6 | 1098 | 191.2 |
| 504 | 18.7 | 736.7 | 416.9 | 184.3 |
| 528 | 17.4 | 880.9 | 233.6 | 163.6 |
| 552 | 12.6 | 896.9 | 211.9 | 158.0 |
| 576 | 14.9 | 965.1 | 173.1 | 135.2 |

The Nyquist plot (FIG. 9) indicates two distinct processes: kinetic and charge transfer control. These plots were fitted using the equivalent electrical circuit, which consists of mixed kinetic and charge-transfer control which appears as a straight line with a slope about 45°, in the impedance plot and is a characteristic of diffusion process. Hence the equivalent circuit fits a Randles's type circuit added by Warburg's diffusion element (W) in parallel with a double layer. As is clear from Table 1, the values of the ohmic resistance (R1) decreases from 24 hrs to 576 hrs after the fabrication of MFC. The values of the charge transfer resistances for the anode/electrolyte interface (R2), show an increasing trend from 24 hrs to 576 hrs after fabrication of MFCs. This could be attributed to accumulation of ions or electrons on the electrode surface via simple diffusion process analogous to the anodic resistance of 1.6 to 1.7 k Ohms. In the present scenario, the conductivity of Graphite decreases with increase in resistance component thereby lowering the electron transfer rate of electrochemical reaction. The CPE values and the direct measure of the magnitude of the electrode/solution interface capacitance increases with time. The diffusion process represented by Warburg element (W) shows an increasing trend from 24 hrs to 576 hrs, after fabrication of MFCs. Hence the power generation decreases with time due to increase in resistance, increase in membrane decay and decrease in the performance of MFCs. Therefore W2>R2>R1, R1 decreases with time, whereas R2 and CPE increases with time indicating higher membrane decay, lower power generation and less performance of MFCs. The dilution of anolyte via formation of water due to oxidation of sucrose causes increase in the anodic resistance of the MFCs from 29.5 Ohm (day 1) to 965 Ohm (day 24) leading to the decrease in its power and current output.

Figure 11:
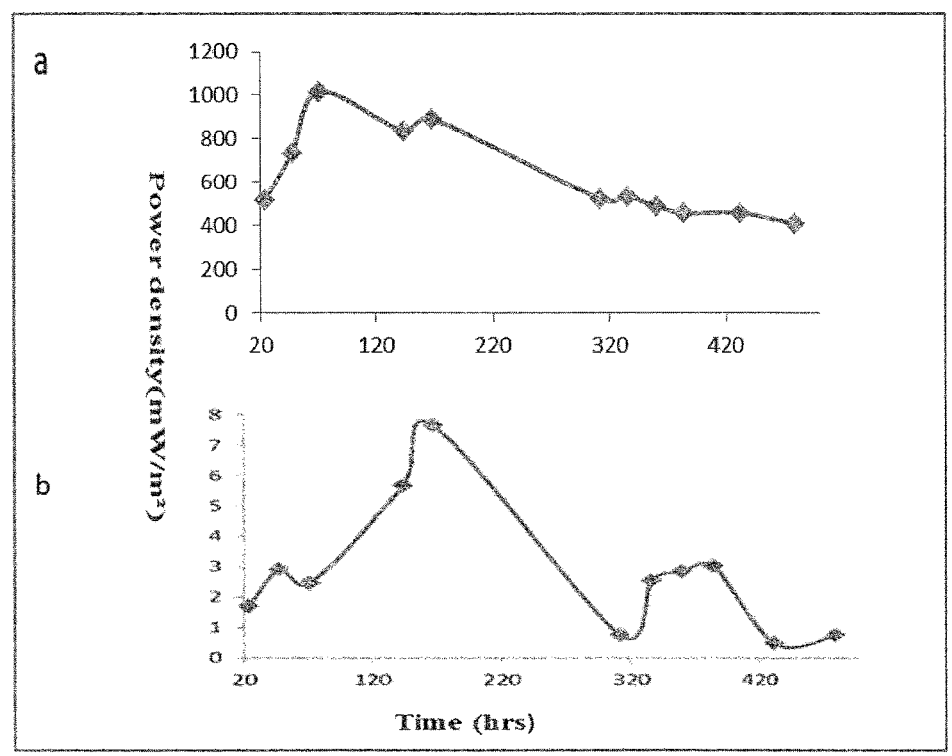
FIG. 11 illustrates a graph of power density Vs time of operation of MFCs a) activated charcoal electrode and b) graphite electrode.
Figure 12:
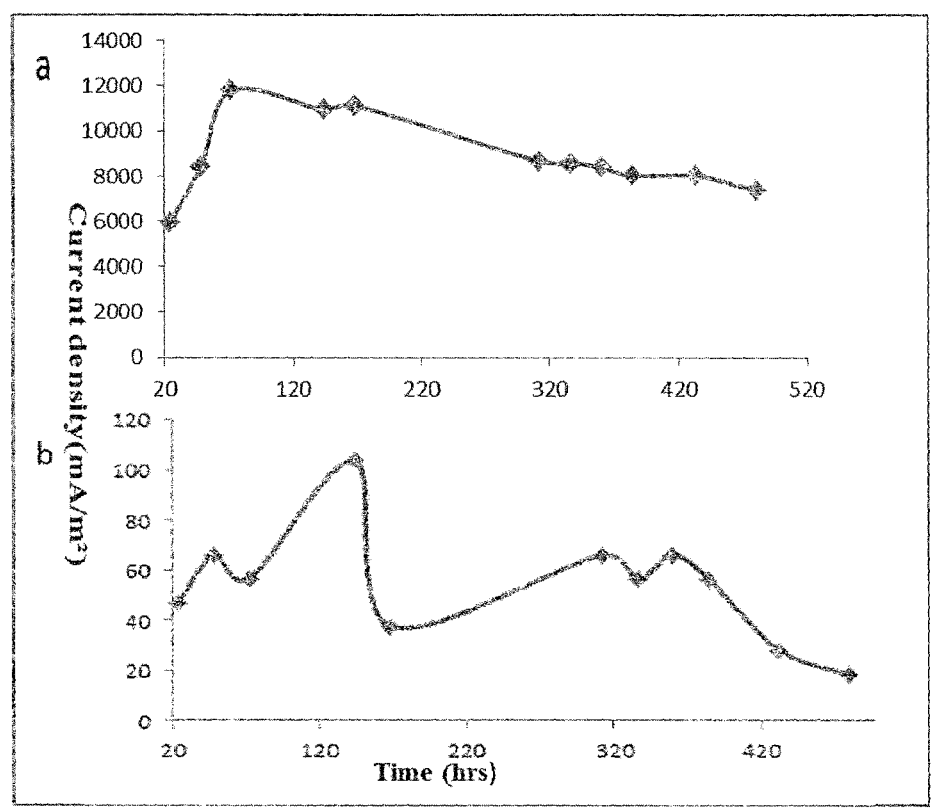
FIG. 12 illustrates a graph of current density Vs time of operation of MFCs a) activated charcoal electrode and b) graphite electrode.
Figure 13:
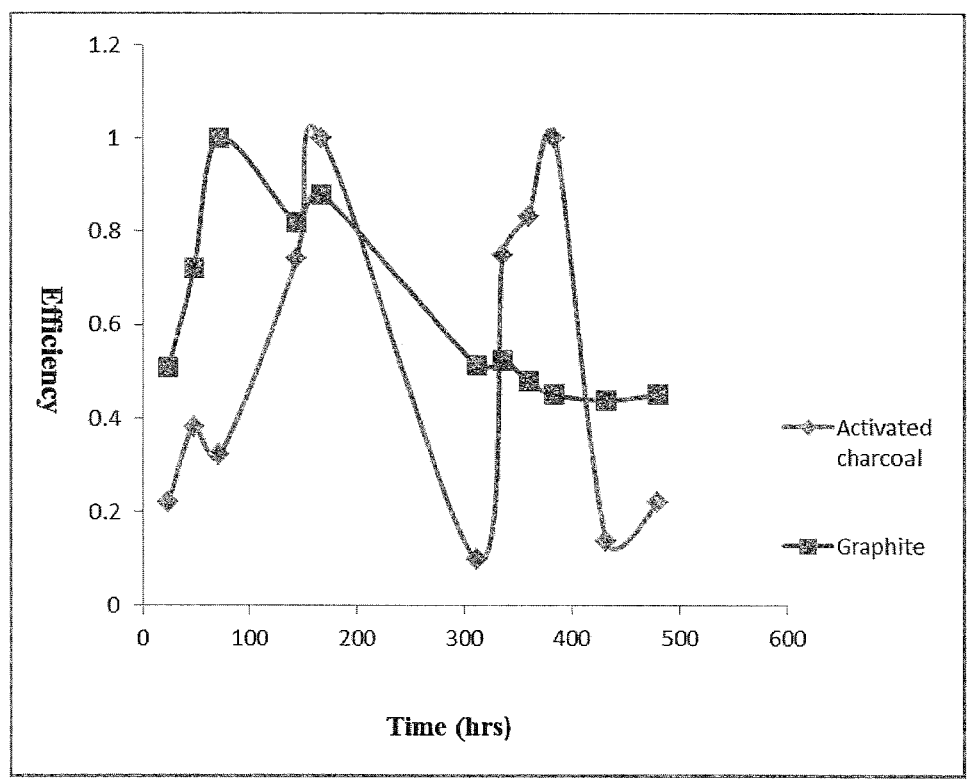
FIG. 13 illustrates a graph of Efficiency Vs time of operation of MFCs fabricated.

I. Power Density and Life Time of Fabricated MFC:
In order to evaluate the long term stability, the output power and efficiency of the cell was monitored with time. Results are depicted in FIGS. 11, 12 and 13. In the present case, the MFCs fabricated are stable for a longer duration of approximately 420 hrs. The maximum power and current density obtained by employing 1 mol l$^{-1}$ Potassium Ferricyanide as mediator was (i) 8 mW/m2 and 103 mA/m2 respectively for activated charcoal electrode based MFCs and (ii) 1015 mW/m2 and 11803.5 mA/m2 for the graphite electrode based MFCs.

II. Activated charcoal based MFC:
From FIGS. 11, 12 and 13, it is clear that the MFC with glucose substrate reaches its maximum efficiency and power output at 168 hrs. The current, power output and efficiency levels of the MFC with glucose substrate started to decrease after 312 hrs due to consumption of glucose. MFC exhibited decreased power level within 72 hrs and again started to increase upto 168 hrs without renewal of fresh feed in anodic chamber. A second peak is seen at 412 hrs and then falls to zero. Formation of water diluted the anolyte, thereby causing diffusion of more sucrose into the biofilm electrode/electrolyte interface, which leads to further oxidation of the sucrose. This is seen as a second peak in the power density graph for the MFCs. This kind of behavior is seen on the continuous flow MFCs where replenishing of glucose happens from external source. In the present scenario it is internal replenishing due to dilution and mass transfer phenomena.

III. Graphite based MFC:
From FIGS. 11, 12 and 13, it is clear that the MFCs with glucose substrate reaches its maximum efficiency and power level at 72 hrs. The power and efficiency levels of the MFCs with glucose substrate started to decrease after 144 hrs due to consumption of glucose. The maximum power output of 1015 mW/m$^2$. MFCs showed decreased power output within 72 hrs thereby indicating that stability of bacterial biofilm is more stable on activated charcoal surface than graphite surface.

E. Comparison of Equivalent Circuit:
Equivalent Circuit of Activated Charcoal Based MFC:
From the FIG. 7, it is evident that the resistance of catholyte in MFCs is almost zero or negligible at all scan rates. The internal resistance of MFCs is contributed by anolyte resistance. From FIG. 10, we can say that anode activation polarization is well within the range of −0.15V to −0.14V which shows the activation polarization is not the rate determining step for glucose oxidation on activated charcoal electrode. Since activated charcoal has higher surface area, higher will be the biofilm formation and the rate of electron transfer without queuing of ions or electrons on the electrode surface.

Equivalent Circuit of Graphite Based MFC:
From the FIG. 10, it can inferred that the internal resistance corresponds to both anolyte and catholyte resistance. The concentration polarization (diffusion) and activation polarization (charge transfer resistance) increases with time. Due to increase charge transfer resistance with time the stability of biofilm formed is low. Thus activation polarization is the rate determining step for glucose oxidation on graphite electrode. Therefore queuing of ions or electrons on graphite electrode reduces the conductivity of the electrode. Hence the electron transfer rate is lower and the power generation falls off at shorter interval.

Technical Advancements and Economical Significance

The technical advancements offered by the microbial fuel cell of the present disclosure include the realization of:
Power generation from waste;
Recycling of waste, as microbes use waste to produce natural fertilizers for plants;
Real-time power generation; and
High power density output compared to conventional apparatuses.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

The numerical values mentioned for the various physical parameters, dimensions or quantities are only approximations and it is envisaged that the values ten percent higher/lower than the numerical values assigned to the parameters, dimensions or quantities fall within the scope of the disclosure, unless there is a statement in the specification specific to the contrary.

While considerable emphasis has been placed herein on the various components of the preferred embodiment, it will be appreciated that many alterations can be made and that many modifications can be made in the preferred embodiment without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A microbial fuel cell comprising:
an anode chamber having an anode, said anode chamber filled with a first mixture of a buffer solution, nutrients, and at least one microbial inoculum;
a cathode chamber having a cathode, said cathode chamber filled with a second mixture of a catholyte mediator having concentration of 50 mM and an electron mediator having concentration of 1 M, said cathode chamber connected to anode chamber via a salt bridge, and said cathode and said anode connected through an external electrical circuit, wherein said anode is sealed to maintain anaerobic condition inside the anode chamber, while the cathode chamber is maintained in aerobic condition.

2. The microbial fuel cell according to claim 1, wherein a passage is provided in an operative top cover of the anode chamber to allow escape of unwanted gases.

3. The microbial fuel cell according to claim 1, wherein a passage is provided in an operative top cover of said cathode chamber to allow aerobic condition.

4. The microbial fuel cell according to claim 1, wherein the salt bridge includes a tubular structure open at both ends and filled with agar agar gel mixed with saturated potassium chloride (KCl).

5. The microbial fuel cell according to claim 1, wherein the microbial inoculum is cow dung.

6. The microbial fuel cell according to claim 1, wherein the nutrient is at least one selected from the group consisting of fruit waste, vegetable waste, biodegradable waste and kitchen waste.

7. The microbial fuel cell according to claim 1, wherein the catholyte mediator is phosphate buffer solution.

8. The microbial fuel cell according to claim 1, wherein the electron mediator is a potassium ferricyanide solution.

9. A microbial fuel cell stack comprising a plurality of the microbial fuel cells, according to claim 1, connected either in series or in parallel.

10. The microbial fuel cell according to claim 1, wherein each of said cathode and said anode is an activated charcoal electrode and said microbial fuel cell, using said activated charcoal electrodes, is configured to provide the power density of 8 $mW/m^2$ and the current density of 103 $mA/m^2$, when said microbial fuel cell is coupled to a load.

11. The microbial fuel cell according to claim 1, wherein each of said cathode and said anode is a graphite electrode and said microbial fuel cell, using said graphite electrodes, is configured to provide the power density of 1015 $mW/m^2$ and the current density of 11803.5 $mA/m^2$, when said microbial fuel cell is coupled to a load.

12. The microbial fuel cell according to claim 1, wherein the microbial fuel cell provides a current density of at least 50 $mA/m^2$.

13. The microbial fuel cell according to claim 1, wherein the microbial fuel cell provides a current density of at least 100 $mA/m^2$.

14. The microbial fuel cell according to claim 1, wherein the microbial fuel cell provides a power density of at least 8 $mW/m^2$.

* * * * *